(12) United States Patent
Kimura et al.

(10) Patent No.: US 11,280,246 B2
(45) Date of Patent: Mar. 22, 2022

(54) HEAT INSULATING MATERIAL

(71) Applicant: Kubota Corporation, Osaka (JP)

(72) Inventors: Taketo Kimura, Sakai (JP); Hayato Kawano, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/209,232

(22) Filed: Mar. 23, 2021

(65) Prior Publication Data
US 2022/0034253 A1 Feb. 3, 2022

(30) Foreign Application Priority Data
Aug. 3, 2020 (JP) ............................ JP2020-131700

(51) Int. Cl.
*F01N 3/02* (2006.01)
*F01N 13/00* (2010.01)
*F01N 13/14* (2010.01)
*F01N 3/021* (2006.01)

(52) U.S. Cl.
CPC ............. *F01N 13/14* (2013.01); *F01N 3/0211* (2013.01); *F01N 13/008* (2013.01); *F01N 2310/00* (2013.01); *F01N 2510/02* (2013.01)

(58) Field of Classification Search
CPC .............. F01N 3/0211; F01N 13/008; F01N 13/14–148; F01N 2310/00–14; F01N 2510/02
See application file for complete search history.

(56) References Cited

U.S. PATENT DOCUMENTS

| | | | | |
|---|---|---|---|---|
| 6,613,295 B1 * | 9/2003 | Kageyama | ............. | B01D 53/94 422/179 |
| 6,923,942 B1 * | 8/2005 | Shirk | .................... | F01N 3/2857 422/179 |
| 8,066,792 B2 * | 11/2011 | Wadke | .................... | F01N 13/16 55/523 |
| 8,663,357 B2 * | 3/2014 | Mitani | .................. | F01N 3/0211 55/523 |
| 2012/0134889 A1 * | 5/2012 | Freis | .................. | F01N 13/1894 422/168 |
| 2014/0248187 A1 * | 9/2014 | Wikaryasz | .......... | F01N 13/0097 422/168 |

FOREIGN PATENT DOCUMENTS

| | | |
|---|---|---|
| JP | 5849136 B2 | 2/2015 |
| JP | 6245926 B2 | 4/2015 |
| JP | 6463884 B2 | 4/2015 |

* cited by examiner

*Primary Examiner* — Audrey B. Walter
(74) *Attorney, Agent, or Firm* — Mori & Ward, LLP

(57) ABSTRACT

A heat insulating material includes a central portion to cover a first base or a second base of an exhaust gas purifier of an engine, and a first rectangular portion and a second rectangular portion which have substantially rectangular shapes and which are connected to the central portion substantially symmetrically with respect to a center of the central portion. The second base is provided opposite to the first base. The first rectangular portion and the second rectangular portion are configured to cover a side surface of the exhaust gas purifier. The side surface connects the first base and the second base.

15 Claims, 8 Drawing Sheets

HEAT INSULATING MATERIAL

CROSS-REFERENCE TO RELATED APPLICATIONS

The present application claims priority under 35 U.S.C. § 119 to Japanese Patent Application No. 2020-131700, filed Aug. 3, 2020. The contents of this application are incorporated herein by reference in their entirety.

BACKGROUND OF THE INVENTION

Field of the Invention

The present invention relates to a heat insulating material.

Discussion of the Background

Japanese Patent Nos. 6245926 and 6463884 describe heat insulators that are wound and attached to an exhaust gas purifier having a shape in which both ends of a cylindrical tube are tapered. The heat insulating material can be attached to the exhaust treatment device by bending a series of planar members.

The heat insulating materials of Japanese Patent Nos. 6245926 and 6463884 are applied to an exhaust gas purifier in which an exhaust pipe is connected to a cylindrical first base and a second base, but is not applied to an exhaust gas purifier in which an exhaust pipe is connected to a side surface (cylindrical surface) connecting the first base and the second base.

SUMMARY OF THE INVENTION

According to an aspect of the present disclosure, a heat insulating material includes a central portion to cover a first base or a second base of an exhaust gas purifier of an engine, and a first rectangular portion and a second rectangular portion which have substantially rectangular shapes and which are connected to the central portion substantially symmetrically with respect to a center of the central portion. The second base is provided opposite to the first base. The first rectangular portion and the second rectangular portion are configured to cover a side surface of the exhaust gas purifier. The side surface connects the first base and the second base.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
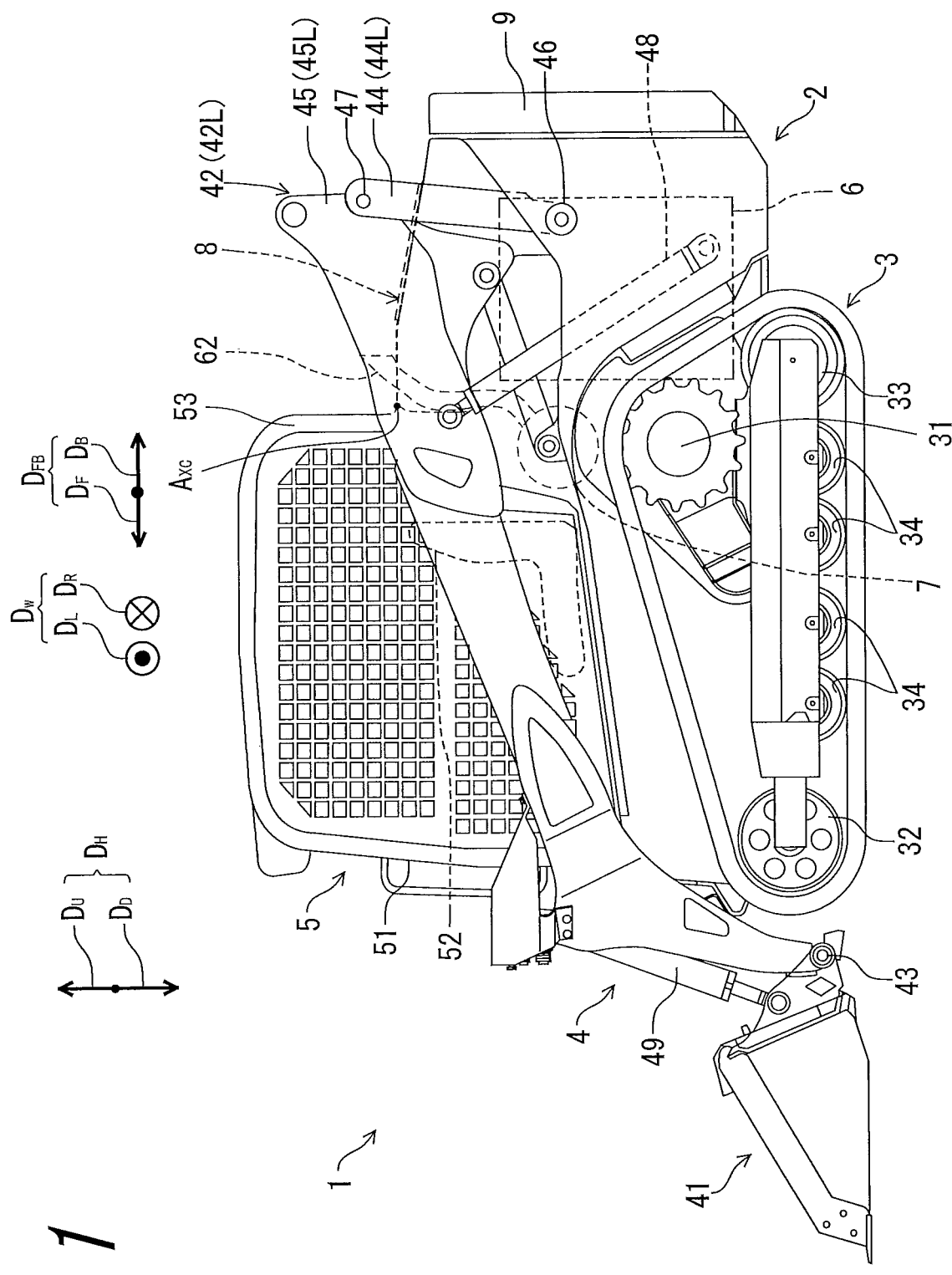
FIG. 1 is a side view of a work vehicle.

The embodiments will now be described with reference to the accompanying drawings, wherein like reference numerals designate corresponding or identical elements throughout the various drawings.

Hereinafter, the present invention will be specifically described with reference to the drawings showing embodiments thereof. In the drawings, like reference numerals denote corresponding or substantially identical configurations.

<Overall Composition>

Figure 2:
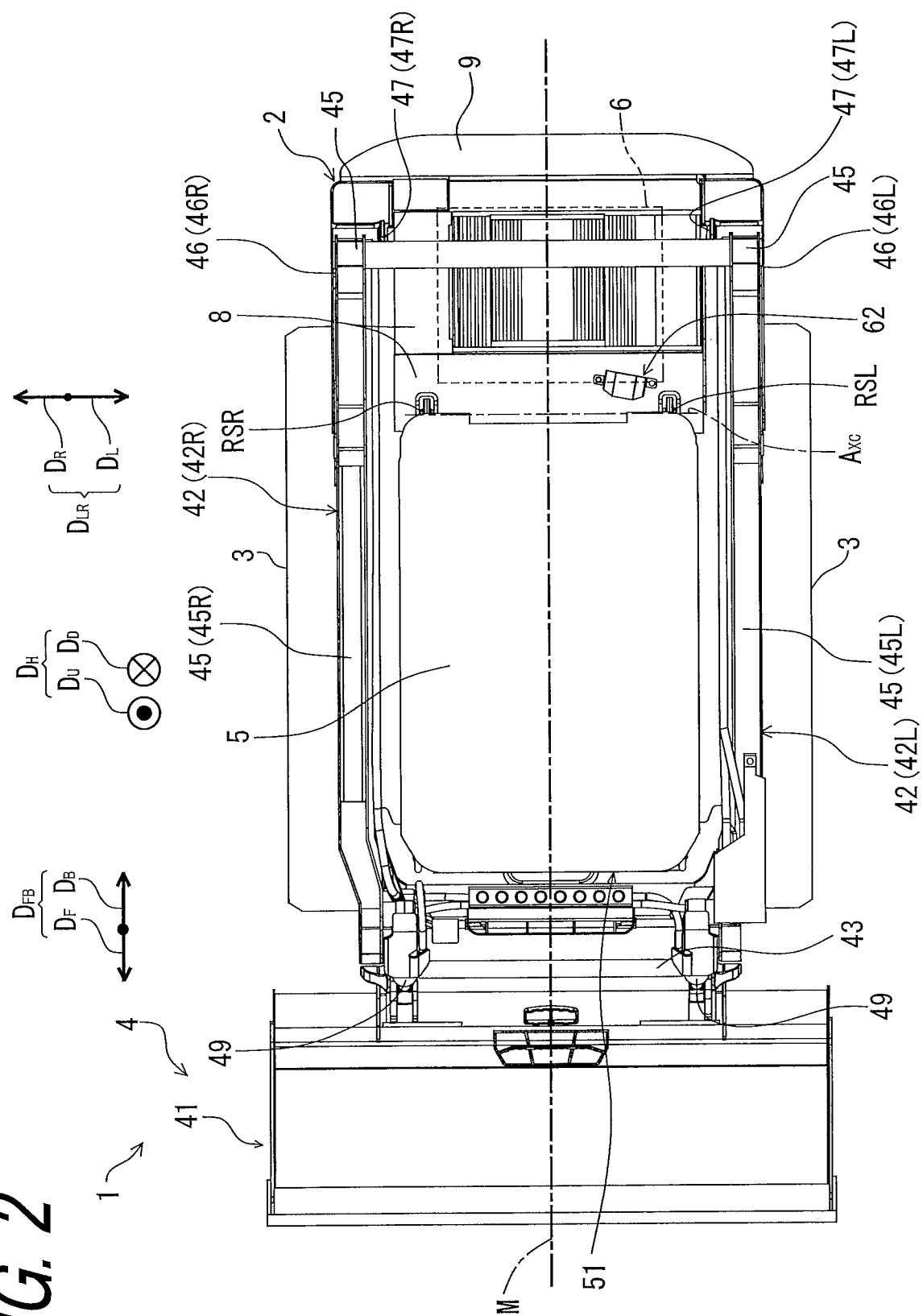
FIG. 2 is a top view of a work vehicle.

Referring to FIGS. 1 and 2, a work vehicle 1, such as a compact track loader, includes a vehicle body frame 2, a traveling device 3, a working device 4, and a cabin 5. The vehicle body frame 2 supports the traveling device 3, the working device 4, and the cabin 5. In the illustrated embodiment, the traveling device 3 is a crawler type traveling device. Therefore, the traveling device 3 includes a driving wheel 31, driven wheels 32 and 33, and a roller 34. However, the traveling device 3 is not limited to a crawler type traveling device. The traveling device 3 may be, for example, a front-wheel/rear-wheel traveling device or a traveling device having a front wheel and a rear crawler. The working device 4 includes a work equipment 41 at the distal end of the working device 4. The work equipment 41 is, for example, a bucket. The base end of the working device 4 is attached to the rear part of the vehicle body frame 2. The working device 4 includes a pair of arms 42 for rotatably supporting the bucket 41 through a bucket pivot shaft 43. Each of the pair of arms 42 includes a lift link 44 and a boom 45.

The lift link 44 is rotatable about the fulcrum shaft 46 relative to the vehicle body frame 2. The boom 45 is rotatable about the joint shaft 47 relative to the lift link 44. The working device 4 further includes a plurality of boom cylinders 48 and at least one equipment cylinder 49. Each of the plurality of boom cylinders 48 is rotatably connected to the vehicle body frame 2 and the boom 45 and moves the lift link 44 and the boom 45 to raise and lower the bucket 41. At least one equipment cylinder 49 is configured to tilt the bucket 41. The cabin 5 is attached to the front part of the vehicle body frame 2. A work vehicle 1 includes a front door 51 in front of a cabin 5, and a driver's seat 52 and an operation device (Not shown) in the cabin 5. As shown in FIG. 2, the cab frame 53 is rotatable about rotation axes RSL and RSR on the vehicle body frame 2. In FIGS. 1 and 2, a common rotation axis AXC defined by rotation axes RSL and RSR is illustrated.

In the embodiment according to the present application, the front-rear direction DFB (Forward DF/Back DB) means the front-rear direction (Forward/Back) as viewed from an operator sitting on the driver's seat 52 of the cabin 5. The left direction DL, the right direction DR, and the width direction DW mean the left direction, the right direction, and the left and right direction, respectively, as viewed from the operator. The upward direction DU, the downward direction DD, and the height direction DH mean the upward direction, the downward direction, and the height direction when viewed from the operator. The front-back/right-left (width)/up-down (Height) directions of the work vehicle 1 correspond to the front-back/left-right (width)/up-down (Height) directions viewed from the operator.

FIG. 1 shows the left side of the work vehicle 1. As shown in FIG. 2, the vehicle body frame 2 is generally symmetrical with respect to the vehicle body center plane M, and of the pair of arms 42, an arm 42 provided on the left side with respect to the vehicle body center plane M is shown as a first arm 42L, and an arm 42 provided on the right side with respect to the vehicle body center plane M is shown as a second arm 42R. A lift link 44 provided on the left side of the vehicle body center plane M is shown as a first lift link 44L. A boom 45 provided on the left side of the vehicle body center plane M is shown as a first boom 45L, and a boom 45 provided on the right side of the vehicle body center plane M is shown as a second boom 45R. A fulcrum shaft 46 provided on the left side with respect to the vehicle body center plane M is shown as a first fulcrum shaft 46L, and a fulcrum shaft 46 provided on the right side with respect to the vehicle body center plane M is shown as a second fulcrum shaft 46R. A joint shaft 47 provided on the left side of the vehicle body center plane M is shown as a first joint shaft 47L, and a joint shaft 47 provided on the right side of the vehicle body center plane M is shown as a second joint shaft 47R.

Figure 3:
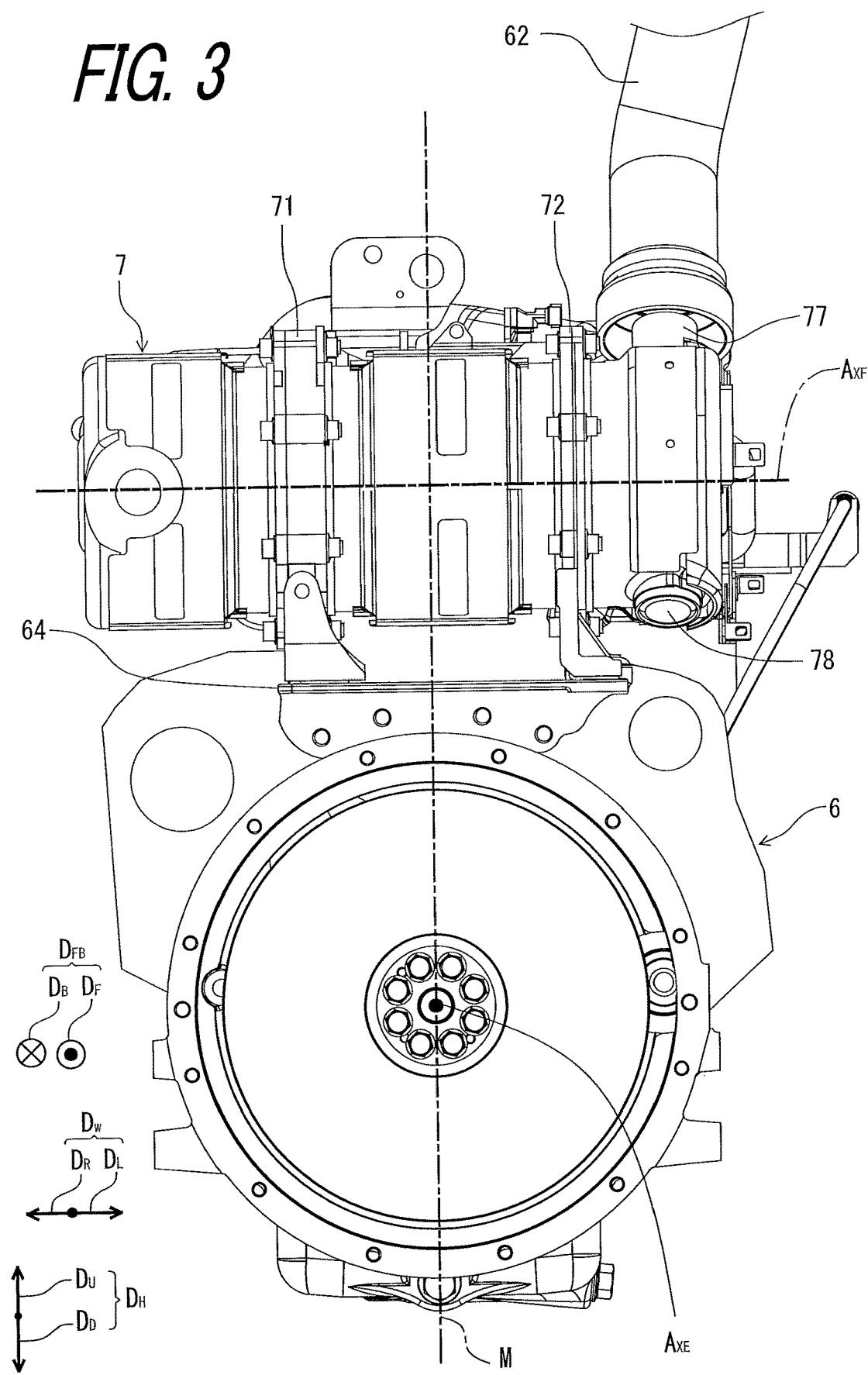
FIG. 3 is a front view of the engine periphery.

Referring to FIGS. 1 and 2, the work vehicle 1 further includes an engine 6 provided at the rear of the vehicle body frame 2. The engine 6 is configured to provide driving force to the traveling device 3 and the working device 4. The engine 6 is provided between the pair of arms 42 in the width direction DW of the work vehicle 1. As shown in FIG. 3 to be described later, the engine 6 is disposed in the vehicle body frame 2 so that the crankshaft AXE of the engine 6 extends substantially on the vehicle body center plane M in the front-rear direction DFB. The work vehicle 1 further includes a cover 8 for covering the engine 6. The work vehicle 1 further includes a bonnet cover 9 provided at the rear end of the vehicle body frame 2. The bonnet cover 9 can be opened and closed, and a maintenance worker can perform maintenance work of the engine 6 or the like.

Referring to FIG. 1, the engine 6 is connected to an exhaust gas purifier 7 for processing exhaust gas from the engine 6. The exhaust gas purifier 7 includes, for example, a particulate collection filter. The particulate collection filter is, for example, a diesel particulate collection filter (DPF). However, the exhaust gas purifier 7 may include a selective reduction catalyst apparatus (SCR) or an oxidation catalyst. The oxidation catalyst is, for example, a diesel oxidation catalyst (DOC). The exhaust gas treated by the exhaust gas purifier 7 is discharged from an exhaust pipe 62.

Figure 4:
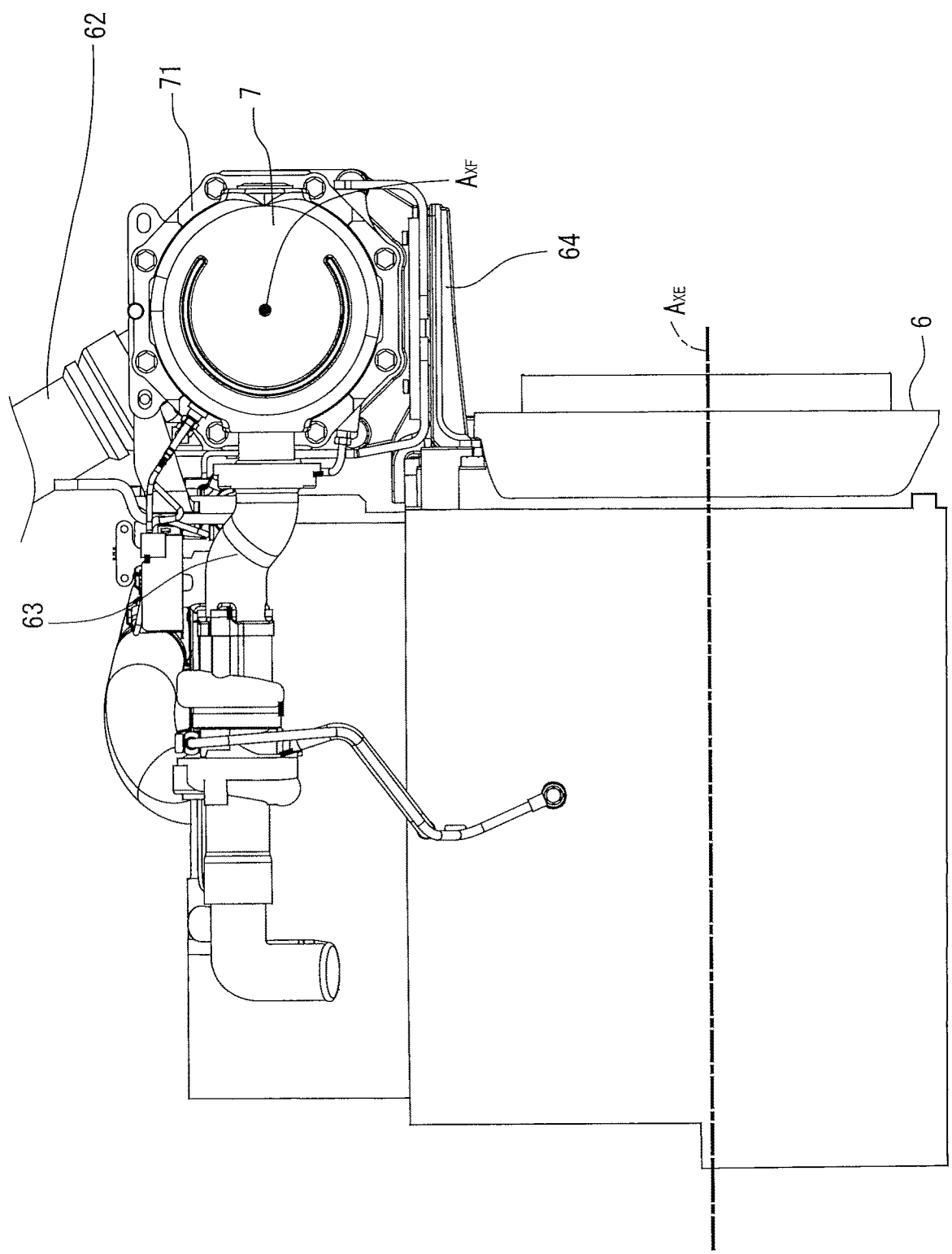
FIG. 4 is a side view of the engine periphery.

FIG. 3 is a front view of the periphery of the engine 6. In FIG. 3, illustration of the engine 6, the exhaust gas purifier 7, and the exhaust pipe 62 is omitted. FIG. 4 is a view of the periphery of the engine 6 shown in FIG. 3 as viewed from the right side. As shown in FIGS. 3 and 4, the exhaust gas purifier 7 is provided in front of the engine 6 and is connected to the engine 6 through a connecting pipe 63. As shown in FIG. 4, the connecting pipe 63 is connected to the right end of the exhaust gas purifier 7. As shown in FIG. 3, the exhaust pipe 62 is connected to the left end of the exhaust gas purifier 7. As shown in FIGS. 3 and 4, the exhaust gas purifier 7 has a substantially cylindrical shape, and is attached to the engine 6 such that its central axis AXF is substantially perpendicular to the crankshaft AXE of the engine 6. The exhaust gas purifier 7 has flanges 71, 72, and the exhaust gas purifier 7 is attached to the engine 6 by fixing the flanges 71, 72 to a bracket 64 attached to the engine 6.

Figure 5:
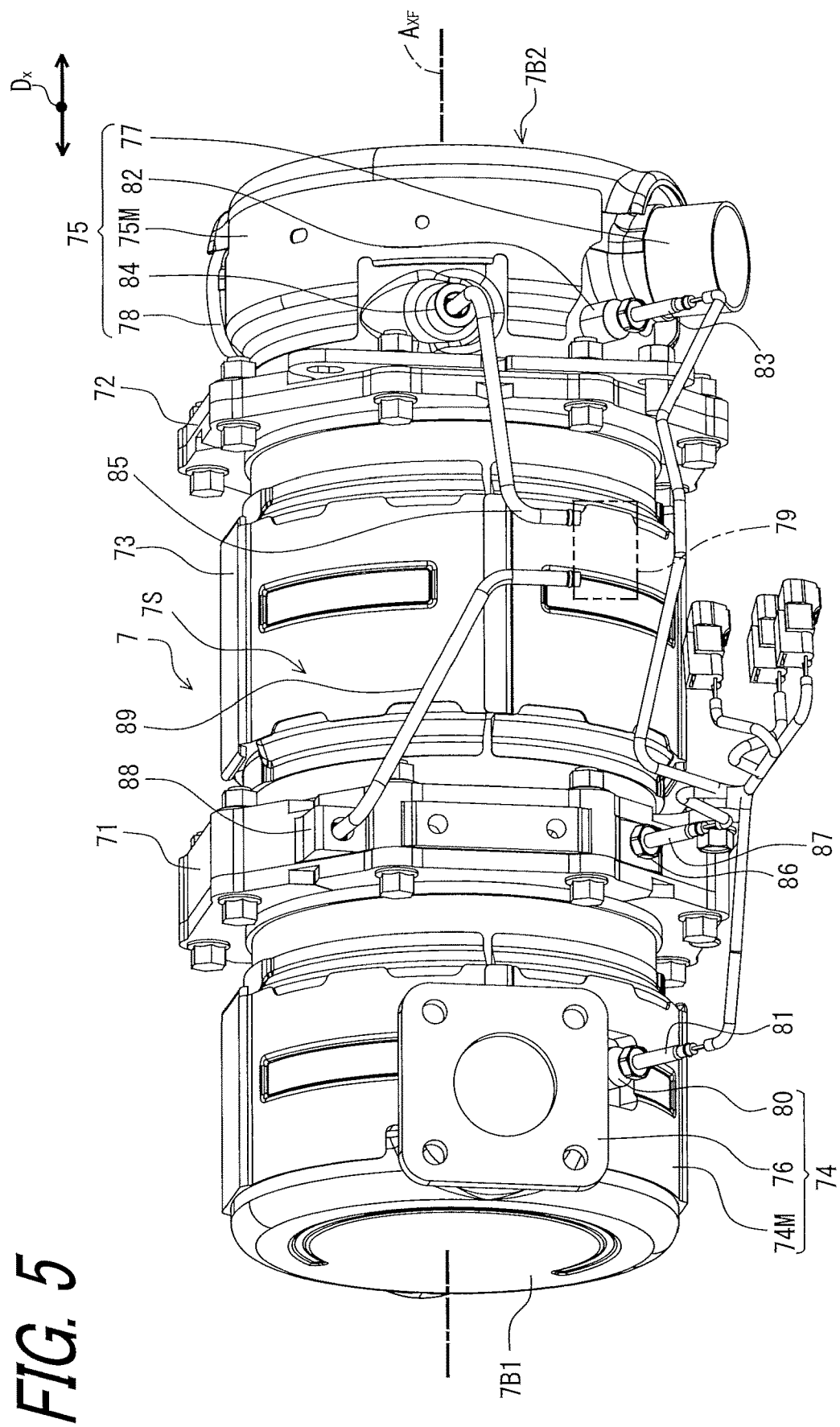
FIG. 5 is an enlarged view of the exhaust gas purifier.

FIG. 5 is an enlarged view of the exhaust gas purifier 7. In FIG. 5, a device connected to the exhaust gas purifier 7 except the connecting pipe 63 and the exhaust pipe 62 is also shown. Referring to FIG. 5, it has a columnar shape having a first base 7B1 and a second base 7B2 arranged opposite to each other and a side surface 7S connecting the first base 7B1 and the second base B2. The exhaust gas purifier 7 further includes a middle portion 73, a first end portion 74, and a second end portion 75. The middle portion 73 is provided between the flange 71 and the flange 72 in the axial direction DX along the central axis AXF. The middle portion 73 has a generally cylindrical shape. The flange 71 and the flange 72 project from the middle portion 73 in the radial direction with respect to the central axis AXF.

The first end portion 74 is provided on the opposite side of the middle portion 73 in the axial direction DX with respect to the flange 71. The first end portion 74 includes a first end body 74M, a connecting pipe mounting portion 76, and a first temperature sensor attachment 80. The first end body 74M has a substantially cylindrical shape. A first temperature sensor 81 for measuring the temperature inside the first end body 74M is attached to the first temperature sensor attachment 80. A connecting pipe 63 is attached to the connecting pipe mounting portion 76. The connecting pipe mounting portion 76 and the first temperature sensor attachment 80 project radially from the first end body 74M with respect to the central axis AXF.

The second end portion 75 is provided on the opposite side of the middle portion 73 with respect to the flange 72. The second end portion 75 includes a second end body 75M, an exhaust port 77, a closed pipe portion 78, a second temperature sensor attachment 82, and a first pressure supply pipe mounting portion 84. The second end body 75M has a substantially cylindrical shape. As shown in FIG. 3, the exhaust pipe 62 is installed so as to surround the exhaust port 77. The closed pipe portion 78 is provided on the opposite side of the exhaust port 77 with respect to the central axis AXF. As shown in FIG. 3, the closed pipe portion 78 has a pipe-like shape, and its tip is closed. A second temperature sensor 83 for measuring the temperature inside the second end body 75M is attached to the second temperature sensor attachment 82. A first pressure supply pipe 85 for supplying the pressure inside the second end body 75M to the differential pressure sensor 79 is connected to the first pressure supply pipe mounting portion 84. The exhaust port 77, the closed pipe portion 78, the second temperature sensor attachment 82, and the first pressure supply pipe mounting portion 84 project from the second end body 75M in the radial direction with respect to the central axis AXF.

The flange 71 includes a third temperature sensor attachment 86 and a second pressure supply pipe mounting portion 88. A third temperature sensor 87 for measuring the temperature inside the flange 71 is mounted on the third temperature sensor attachment 86. A second pressure supply pipe 89 for supplying the pressure inside the flange 71 to the differential pressure sensor 79 is connected to the second pressure supply pipe mounting portion 88. The differential pressure sensor 79 is configured to measure the differential pressure between the pressure supplied from the first pressure supply pipe 85 and the pressure supplied from the second pressure supply pipe 89.

Figure 6:
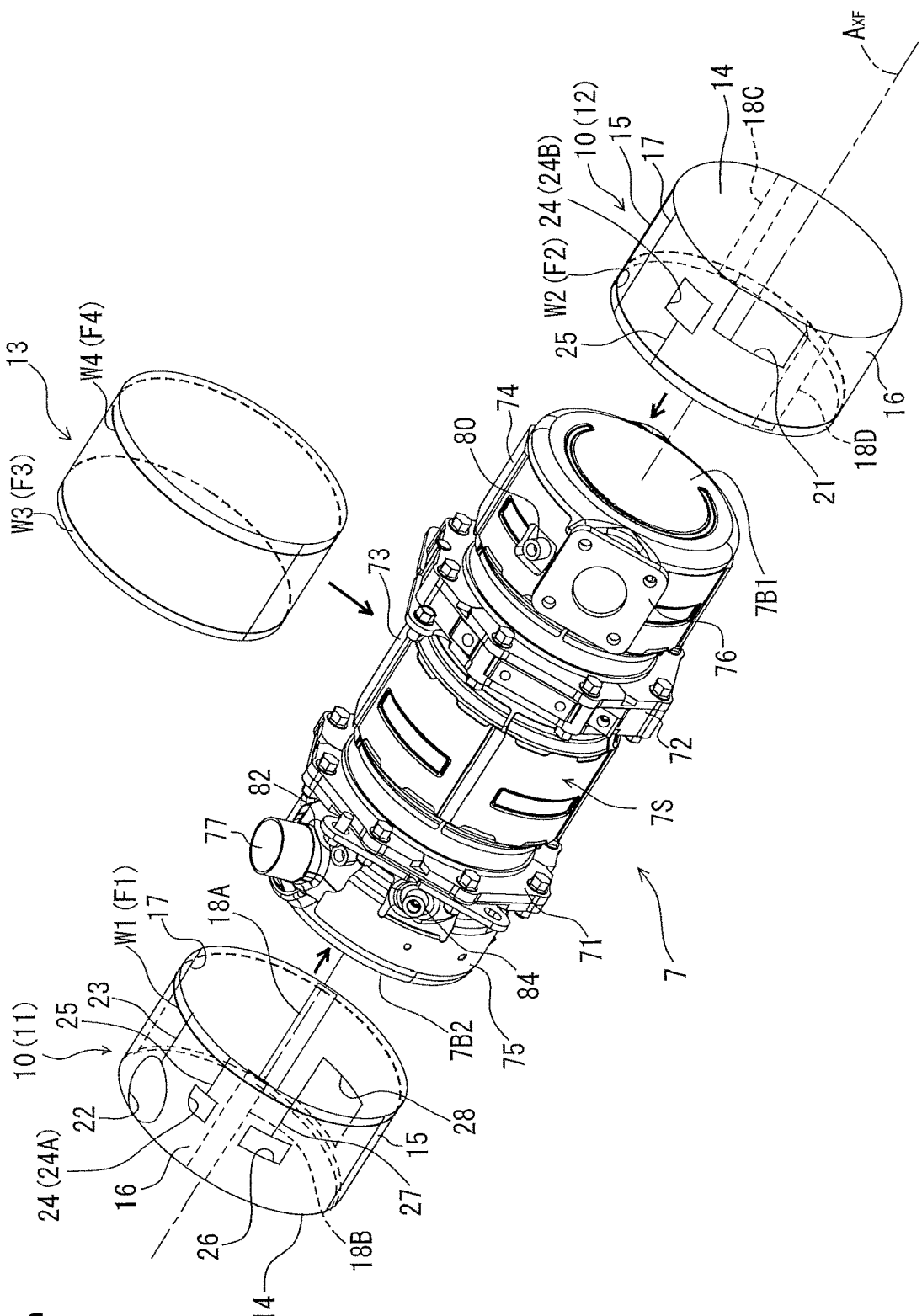
FIG. 6 is a view showing a method of attaching the third heat insulating material from the first heat insulating material to the exhaust gas purifier.
Figure 7:
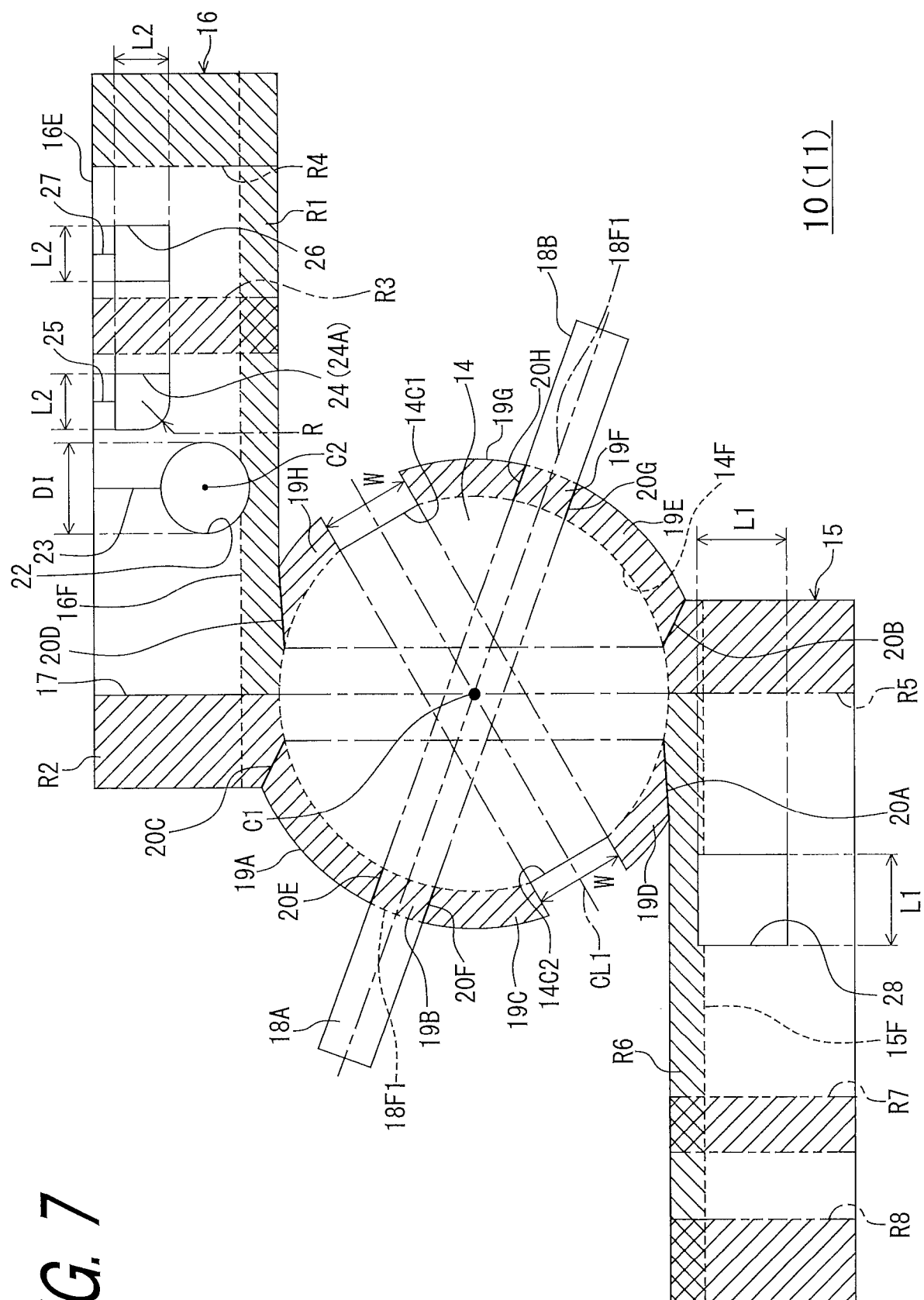
FIG. 7 is a developed view of the first heat insulating material.
Figure 8:
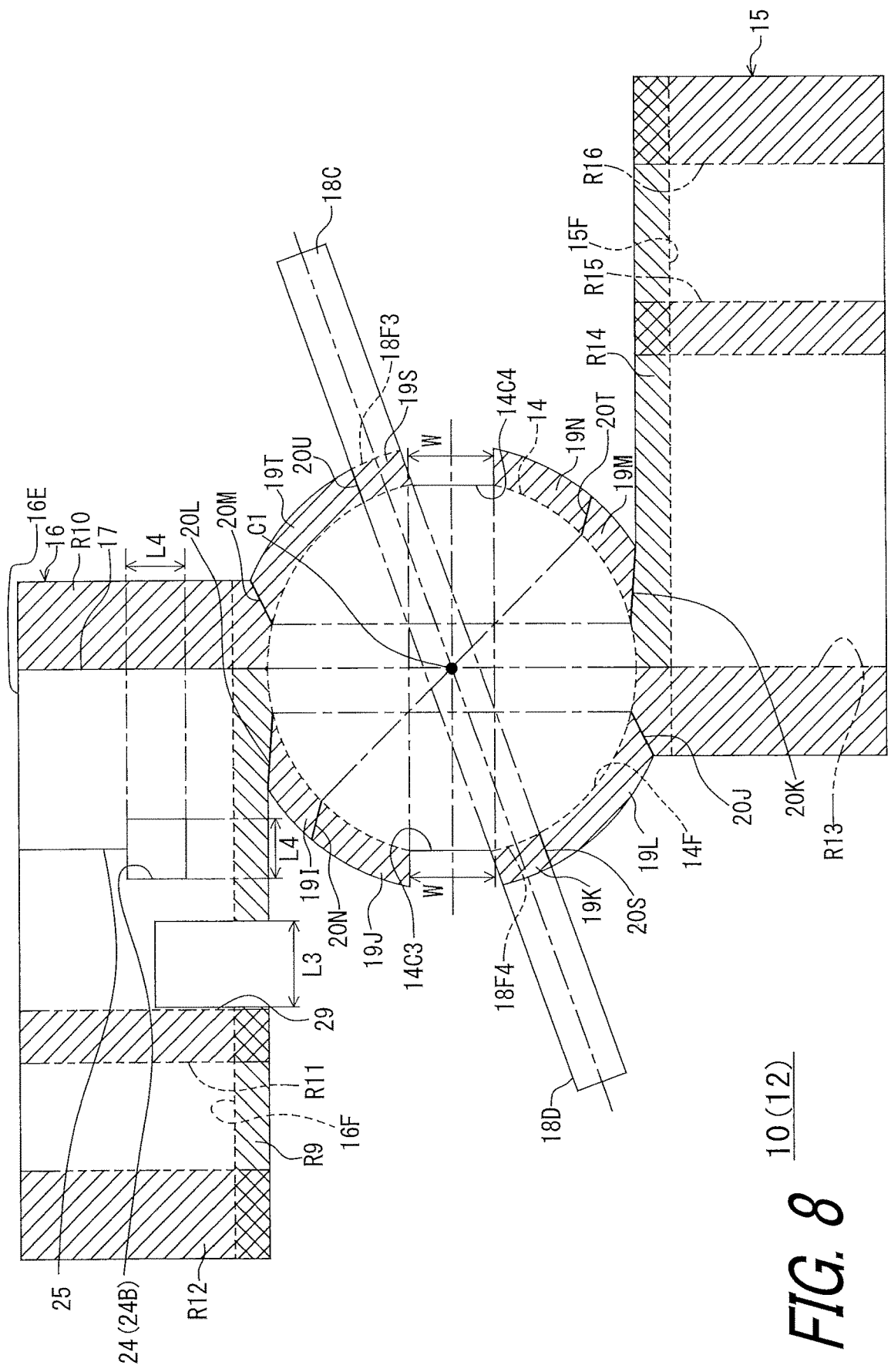
FIG. 8 is a developed view of the second heat insulating material.

Although not shown in FIGS. 3 to 5, since the temperature of the exhaust gas purifier 7 rises during exhaust treatment, the first heat insulating material 11, the second heat insulating material 12, and the third heat insulating material 13 are attached to the exhaust gas purifier 7 as shown in FIG. 6 so as not to exceed the heat resistant temperature of other equipment in the engine chamber. The first heat insulating material 11, the second heat insulating material 12, and the third heat insulating material 13 respectively cover the exhaust gas purifier 7. The first heat insulating material 11, the second heat insulating material 12, and the third heat insulating material 13 are formed by bending a sheet-like base material having a thickness of about 5 mm. The sheet-like base material comprises ceramic fibers, silica fibers, glass fibers or a mixture thereof having high heat insulating properties. An adhesive is applied to the surface of the base material facing the exhaust gas purifier 7, and an aluminum foil is adhered to the surface of the base material on the opposite side. The first heat insulating material 11 and the second heat insulating material 12 have common technical features, and the first heat insulating material 11 and the second heat insulating material 12 are collectively referred to as a heat insulating material 10. FIG. 7 is a developed view of the first heat insulating material 11 developed in a plane. FIG. 8 is a developed view of the second heat insulating material 12 developed in a plane. In FIGS. 7 and 8, the surface to which the aluminum foil is attached is indicated, and the adhesive is applied on the back side thereof.

Referring to FIGS. 7 and 8, the shape in which the heat insulating material 10 (first heat insulating material 11, a second heat insulating material 12) is expanded into a plane has a central portion 14, a first rectangular portion 15, and a second rectangular portion 16. Referring to FIG. 6, the central portion 14 covers the first base 7B1 or the second base 7B2 of the exhaust gas purifier 7. The central portion 14 is an area surrounded by a fold 14F indicated by a dotted line and notches 14C1 and 14C2 or notches 14C3 and 14C4. The first rectangular portion 15 and the second rectangular portion 16 cover the side surface 7S of the exhaust gas purifier 7. The second rectangular portion 16 is provided with a slit 17 for preventing separation of the heat insulating material 10 (first heat insulating material 11, a second heat insulating material 12) from the exhaust gas purifier 7. Referring to FIGS. 7 and 8, the first rectangular portion 15 and the second rectangular portion 16 are provided symmetrically with respect to the center C1 of the central portion 14. The central portion 14 is a figure which is point-symmetric with respect to the center C1. The central portion 14 has a substantially circular shape. Substantially circular means circular except for partial notches 14C1, 14C2, 14C3, and 14C4. The notches 14C1 and 14C2 are provided point-symmetrically with respect to the center C1. The notches 14C3 and 14C4 are provided point-symmetrically with respect to the center C1.

Referring to FIG. 7, a shape in which the heat insulating material 10 (First thermal insulator 11) is expanded in a plane further includes a first extending portion 18A configured to extend from the central portion 14 in a direction away from the center C1 and to be connected to the first rectangular portion 15. The shape further has a second extending portion 18B point-symmetrical to the first extending portion 18A with respect to the center C1. The shape further includes a plurality of pasting margins 19A, 19B, 19C, 19D, 19E, 19F, 19G, and 19H that extend from the central portion 19 in a direction away from the center C1 and are configured to connect to the first rectangular portion 15 or the second rectangular portion 16. The pasting margins 19A, 19B, 19C, 19D, 19E, 19F, 19G, and 19H are portions where the base materials of the heat insulating material 10 (First thermal insulator 11) are bonded to each other. The pasting margin 19B is positioned between the central portion 14 and the first extending portion 18A. The pasting margin 19F is located between the central portion 14 and the second extending portion 18B.

First additional slits 20A and 20B are provided at boundaries between the first rectangular portion 15 and the plurality of pasting margins 19D and 19E, respectively. First additional slits 20C and 20D are provided at boundaries between the second rectangular portion 16 and the plurality of pasting margins 19A and 19H, respectively. A first additional slit 20E is provided at a boundary between adjacent pasting margins 19A and 19B out of the plurality of pasting margins 19A, 19B, 19C, 19D, 19E, 19F, 19G, and 19H. Similarly, a first additional slit 20F is provided at a boundary between adjacent pasting margins 19B and 19C. A first additional slit 20G is provided at a boundary between adjacent pasting margins 19E and 19F. A first additional slit 20H is provided at a boundary between adjacent pasting margins 19F and 19G.

Further, referring to FIG. 7, the second rectangular portion 16 of the first heat insulating material 11 has a first through hole 22 for penetrating the exhaust pipe 62 for discharging the exhaust from the exhaust gas purifier 7. The first through hole 22 has a circular shape having a center C2 and a diameter DI. The diameter DI is equal to the width W of the notch 14C1. The center C2 of the first through hole 22 is superimposed on a straight line CL1 passing through the center C1 of the central portion 14 and passing through the center of the notch 14C1 when the second rectangular portion 16 is bent and viewed from the direction perpendicular to the plane forming the central portion 14.

The second rectangular portion 16 has a second through hole 24 (second through hole 24A) for allowing a temperature sensor (Second temperature sensor 83) mounted on the exhaust gas purifier 7 to pass therethrough. The second through hole 24 (second through hole 24A) has a substantially square shape having a side length L2. However, the second through hole 24A of the first heat insulating material 11 is provided with a roundness R at a corner closest to the first through hole 22 so as not to come too close to the first through hole 22. The second rectangular portion 16 of the first heat insulating material 11 has a third through hole 26 for penetrating a pressure supply pipe (First pressure supply tube 85) connected to a differential pressure sensor 79 mounted on the exhaust gas purifier 7. The third through hole 26 has a substantially square shape having a side length L2. L2 is shorter than DI.

The second rectangular portion 16 has a second additional slit 23 for connecting the first through hole 22 to the outer edge 16E of the second rectangular portion 16. The second rectangular portion 16 has a third additional slit 25 for connecting the second through hole 24 (second through hole 24A) to the outer edge 16E of the second rectangular portion 16. The second rectangular portion 16 of the first heat insulating material 11 has a fourth additional slit 27 which connects the third through hole 26 and the outer edge 16E of the second rectangular portion 16. The first rectangular portion 15 of the first heat insulating material 11 has a fourth through hole 28 for penetrating the closed pipe portion 78. The fourth through hole 28 of the first heat insulating material 11 has a substantially square shape having a side length L1. L1 is equal to the diameter DI of the first through hole 22 and the width W of the notch 14C1.

When the heat insulating material 10 (First thermal insulator 11) is attached to the exhaust gas purifier 7, the slit 17 and the first additional slits 20A, 20B, 20C, 20D, 20E, 20F, 20G, 20H are notched. Then, the central portion 14 is adhered to the second base B2 of the exhaust gas purifier 7 with an adhesive, and the first extending portion 18A, the second extending portion 18B, the pasting margins 19A, 19B, 19C, 19D, 19E, 19F, 19G, and 19H are bent in a mountain-fold from the central portion 14 at the fold 14F indicated by a dotted line, and adhered to the side surface 7S of the exhaust gas purifier 7.

Next, of the second rectangular portion 16, the rear surface (Face opposite the face shown in FIG. 7) of the region R1 of the second rectangular portion 16 is bonded to the pasting margins 19E, 19F, 19G, and 19H with an adhesive. The rear surface of the second rectangular portion 16 excluding the region R1 and the region R2 on the left side of the slit 17 in FIG. 7 (Region including the second through hole 24) is bonded to the side surface 7S of the exhaust gas purifier 7 with an adhesive. At this time, the exhaust pipe 62 is passed through the first through hole 22 through the second additional slit 23. A temperature sensor (Second temperature sensor 83) is passed through the second through hole 24 (second through hole 24A) via the third additional slit 25. The first pressure supply pipe mounting portion 84 or the pressure supply pipe (First pressure supply tube 85) is passed through the third through hole 26 through the fourth additional slit 27. The second extending portion 18B is bonded to the back surface of the region R3 of the second rectangular portion 16 with an adhesive.

Next, the back surface of the region R5 of the first rectangular portion 15 in the first rectangular portion 15 is bonded to the region R4 of the second rectangular portion 16 with an adhesive. The rear surface of the region R6 of the first rectangular portion 15 is bonded to the pasting margins 19A, 19B, 19C, and 19D with an adhesive. The back surface of the first rectangular portion 15 excluding the regions R5 and R6 is bonded to the side surface 7S of the exhaust gas purifier 7 with an adhesive. At this time, the closed pipe portion 78 is passed through the fourth through hole 28. Further, the rear surface of the region R7 of the first rectangular portion 15 is bonded to the first extending portion 18A with an adhesive. Finally, the rear surface of the region R2 of the second rectangular portion 16 is bonded to the region R8 of the first rectangular portion 15 with an adhesive. As described above, since a part (Region R8) of the first rectangular portion 15 is bonded to the second rectangular portion 16 and a part (Region R4) of the second rectangular portion 16 is bonded to the first rectangular portion 15, it is possible to prevent separation of the heat insulating material 10 (First thermal insulator 11) from the exhaust gas purifier 7.

On the other hand, with reference to FIG. 8, the shape in which the heat insulating material 10 (Second insulation 12) is expanded in a plane further includes a first extending portion 18C extending from the central portion 14 in a direction away from the center C1 and configured to be connected to the first rectangular portion 15. The shape further has a second extending portion 18D which is point-symmetric to the first extending portion 18C with respect to the center C1. The shape further includes a plurality of pasting margins 19I, 19J, 19K, 19L, 19M, 19N, 19S, and 14T extending from the central portion 19 in a direction away from the center C1 and configured to connect to the first rectangular portion 15 or the second rectangular portion 16. The pasting margins 19I, 19J, 19K, 19L, 19M, 19N, 19S, and 19T are portions where the base materials of the heat insulating material 10 (Second insulation 12) are bonded to each other. The pasting margin 19S is positioned between the central portion 14 and the first extending portion 18C. The pasting margin 19K is positioned between the central portion 14 and the second extending portion 18D.

First additional slits 20J and 20K are provided at boundaries between the first rectangular portion 15 and the plurality of pasting margins 19L and 19M, respectively. First additional slits 20L and 20M are provided at boundaries between the second rectangular portion 20 and the plurality of pasting margins 19I and 19T, respectively. A first additional slit 20N is provided at a boundary between adjacent pasting margins 19I and 19J out of the plurality of pasting margins 19I, 19J, 19K, 19L, 19M, 19N, 19S, and 19T. Similarly, a first additional slit 20S is provided at a boundary between adjacent pasting margins 19K and 19L. A first additional slit 20T is provided at the boundary between adjacent pasting margins 19N and 19M. A first additional slit 20U is provided at a boundary between adjacent pasting margins 19S and 19T.

Further, referring to FIG. 8, the second rectangular portion 16 of the second heat insulating material 12 has a recess 29 for penetrating the connecting pipe 63 connecting the engine 6 and the exhaust gas purifier 7. The recess 29 has a rectangular shape having a width L3 equal to the width W of the notch 14C3. When the second rectangular portion 16 is bent, the recess 29 is overlapped with the notch 14C3.

The second rectangular portion 16 has a second through hole 24 (second through hole 24B) for allowing a temperature sensor (First temperature sensor 81) mounted on the exhaust gas purifier 7 to pass therethrough. The second through hole 24B of the second heat insulating material 12 has a substantially square shape having a side length L4. L4 is shorter than L3. The second rectangular portion 16 has a third additional slit 25 for connecting the second through hole 24 (second through hole 24B) to the outer edge 16E of the second rectangular portion 16.

When the heat insulating material 10 (Second insulation 12) is attached to the exhaust gas purifier 7, the slit 17 and the first additional slits 20J, 20K, 20L, 20M, 20N, 20S, 20T, 20U are notched. Then, the central portion 14 is adhered to the first base B1 of the exhaust gas purifier 7 with an adhesive, and the first extending portion 18C, the second extending portion 18D, the pasting margins 19I, 19J, 19K, 19L, 19M, 19N, 19S, and 19T are bent in a mountain-fold from the central portion 14 at the fold 14F indicated by a dotted line, and adhered to the side surface 7S of the exhaust gas purifier 7.

Next, the back surface (Face opposite the face shown in FIG. 8) of the region R9 of the second rectangular portion 16 in the second rectangular portion 16 is bonded to the pasting margins 19I, 19J, 19K, and 19L with an adhesive. The rear surface of the second rectangular portion 16 excluding the region R9 and the region R10 on the right side of the slit 17 in FIG. 8 (Region including the second through hole 24) is bonded to the side surface 7S of the exhaust gas purifier 7 with an adhesive. At this time, the connecting pipe 63 is passed through the recess 29. A temperature sensor (First temperature sensor 81) is passed through the second through hole 24 (second through hole 24B) via the third additional slit 25. The second extending portion 18D is bonded to the back surface of the region R11 of the second rectangular portion 16 with an adhesive.

Next, the back surface of the region R13 of the first rectangular portion 15 is bonded to the region R12 of the second rectangular portion 16 15 with an adhesive. The rear surface of the region R14 of the first rectangular portion 15 is bonded to the pasting margins 19M, 19N, 19S, and 19T with an adhesive. The back surface of the first rectangular portion 15 excluding the regions R13 and R14 is bonded to the side surface 7S of the exhaust gas purifier 7 with an adhesive. At this time, the rear surface of the region R15 of the first rectangular portion 15 is bonded to the first extending portion 18C with an adhesive. Finally, the rear surface of the region R10 of the second rectangular portion 16 is bonded to the region R16 of the first rectangular portion 15 with an adhesive. As described above, since a part (region R16) of the first rectangular portion 15 is bonded to the second rectangular portion 16 and a part (region R12) of the second rectangular portion 16 is bonded to the first rectangular portion 15, it is possible to prevent separation of the heat insulating material 10 (second insulation 12) from the exhaust gas purifier 7.

Finally, as shown in FIG. 6, after attaching the first heat insulating material 11 to the second end portion 75 of the exhaust gas purifier 7 with an adhesive, the first heat insulating material 11 is fixed to the second end portion 75 with a wire W1. After the second heat insulating material 12 is stuck to the first end portion 74 of the exhaust gas purifier 7, the second heat insulating material 12 is fixed to the first end portion 74 by a wire W2. The third heat insulating material 13 is formed by winding a rectangular base material in a roll shape. When attaching the second heat insulating material 12 to the middle portion 73 of the exhaust gas purifier 7, the rectangular base material is wound around the middle portion 73, fixed to the middle portion 73 with an adhesive, and then the second heat insulating material 12 is fixed to the middle portion 73 with wires W3 and W4. Since the adhesive surface of the heat insulating material 10 is exposed to a high temperature, the adhesive force may decrease or disappear depending on the material of the adhesive. Even in such a case, the heat insulating material 10 is fixed to the exhaust gas purifier 7 by the wires W1, W2, W3, and W4.

Operation and Effect of Embodiments

Referring to FIG. 6 and the like, the heat insulating material 10 according to the present embodiment is applicable to an exhaust gas purifier in which an exhaust pipe 62 or a connecting pipe 63 is connected to a side surface 7S connecting the first base 7B1 and the second base 7B2. The heat insulating material 10 can be attached to the exhaust gas purifier by bending a series of flat members. As a result, the number of wires required for mounting can be reduced. Further, since the mounting positions of the wires W1 and W2 can be set at positions distant from the second base 7B2 and the first base 7B1, respectively, the wires W1 and W2 hardly come off from the first heat insulating material 11 and the second heat insulating material 12.

Variations of the Embodiments

In the above-described embodiment, the exhaust gas purifier 7 may not be substantially cylindrical, and may be, for example, prismatic. The first base 7B1 and the second base 7B2 may be opposite to each other. In the above-described embodiment, the wires W1, W2, W3, and W4 are exemplified as members for fastening the heat insulating material to the exhaust gas purifier 7, however, such members may be bands. Accordingly, the wires W1, W2, W3, and W4 and the bands are collectively referred to as fastening members F1, F2, F3, and F4.

As used herein, "equip" and its derivatives are non-limiting terms that describe the presence of a component and do not exclude the presence of other components that are not described. This also applies to "have", "Include" and their derivatives.

The terms "~member", "~part", "~element", "~body" and "~structure" may have multiple meanings, such as a single part or multiple parts.

Ordinal numbers such as "first" and "second" are terms used only to identify structures and do not have other meanings (for example, in a particular order). For example, the existence of "first element" does not imply the existence of "second element" and the existence of "second element" does not imply the existence of "first element".

Terms such as "in substance", "roughly", and, which represent degrees, may mean a reasonable amount of deviation such that the final result does not vary significantly unless otherwise explained in the embodiments. All figures described herein may be interpreted to include phrases such as "in substance", "roughly", and the like.

The phrase "At least one of A and B" in this application should be interpreted to include only A, only B, and both A and B.

It will be apparent from the above disclosure that various modifications and modifications of the present invention are possible. Accordingly, the present invention may be practiced in a manner different from the specific disclosure of the present invention without departing from the spirit and spirit of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A heat insulating material comprising:
a central portion to cover a first base or a second base of an exhaust gas purifier of an engine, the second base being provided opposite to the first base; and
a first rectangular portion and a second rectangular portion which have substantially rectangular shapes and which are connected to the central portion substantially symmetrically with respect to a center of the central portion, the first rectangular portion and the second rectangular portion being configured to cover a side surface of the exhaust gas purifier, the side surface connecting the first base and the second base.

2. The heat insulating material according to claim 1, wherein the second rectangular portion has a slit to prevent the heat insulating material from being separated from the exhaust gas purifier.

3. The heat insulating material according to claim 1, wherein the second rectangular portion has a recess through which a connecting pipe connecting the engine and the exhaust gas purifier passes.

4. The heat insulating material according to claim 1, wherein the exhaust gas purifier comprises a particulate collection filter.

5. The heat insulating material according to claim 1, wherein the exhaust gas purifier has a substantially cylindrical shape.

6. The heat insulating material according to claim 5, wherein the central portion has a substantially circular shape.

7. The heat insulating material according to claim 1, wherein the second rectangular portion has a first through hole through which an exhaust pipe for exhaust gas from the exhaust gas purifier passes.

8. The heat insulating material according to claim 7, wherein the second rectangular portion has a second additional slit that connects the first through hole and an outer edge of the second rectangular portion.

9. The heat insulating material according to claim 1, further comprising:
a first extending portion extending from the central portion in a direction away from the center of the central portion and configured to be connected to the first rectangular portion.

10. The heat insulating material according to claim 9, further comprising:

a second extending portion that is point-symmetric to the first extending portion with respect to the center.

11. The heat insulating material according to claim 10, further comprising:

a plurality of pasting margins extending from the central portion in a direction away from the center of the central portion and connected to the first rectangular portion or the second rectangular portion, wherein first additional slits are provided at a boundary between the first rectangular portion and the plurality of pasting margins, at a boundary between the second rectangular portion and the plurality of pasting margins, and at a boundary between adjacent pasting margins among the plurality of pasting margins.

12. The heat insulating material according to claim 1, wherein the second rectangular portion has a second through hole through which a temperature sensor is mounted on the exhaust gas purifier.

13. The heat insulating material according to claim 12, wherein the second rectangular portion has a third additional slit that connects the second through hole and an outer edge of the second rectangular portion.

14. The heat insulating material according to claim 12, wherein the second rectangular portion has a third through hole through which a pressure supply pipe connected to a differential pressure sensor mounted on the exhaust gas purifier passes.

15. The heat insulating material according to claim 14, wherein the second rectangular portion has a fourth additional slit that connects the third through hole and an outer edge of the second rectangular portion.

* * * * *